US008056487B2

(12) United States Patent (10) Patent No.: US 8,056,487 B2
Omori (45) Date of Patent: Nov. 15, 2011

(54) TILTING TABLE DEVICE

(75) Inventor: Mitsuru Omori, Kanazawa (JP)

(73) Assignee: Tsudakoma Kogyo Kabushiki Kaisha, Kanazawa-shi (JP)

( * ) Notice: Subject to any disclaimer, the term of this patent is extended or adjusted under 35 U.S.C. 154(b) by 317 days.

(21) Appl. No.: 12/445,800

(22) PCT Filed: Oct. 23, 2007

(86) PCT No.: PCT/JP2007/070617
§ 371 (c)(1),
(2), (4) Date: Apr. 16, 2009

(87) PCT Pub. No.: WO2008/050748
PCT Pub. Date: May 2, 2008

(65) Prior Publication Data
US 2010/0294173 A1 Nov. 25, 2010

(30) Foreign Application Priority Data

Oct. 27, 2006 (JP) ................................ 2006-291895

(51) Int. Cl.
*A47F 5/12* (2006.01)
(52) U.S. Cl. ................................ 108/7; 108/8
(58) Field of Classification Search .......... 108/1, 2, 108/6, 7, 8, 9; 248/371, 398, 162.1, 404, 248/188.1, 188.3, 372.1
See application file for complete search history.

(56) References Cited

U.S. PATENT DOCUMENTS
1,956,546 A * 4/1934 Froelich ............................ 108/7
(Continued)

FOREIGN PATENT DOCUMENTS
JP 10-225835 A 8/1998
(Continued)

OTHER PUBLICATIONS
International Search Report of PCT/JP2007/070617, Mailing Date of Dec. 4, 2007.

*Primary Examiner* — Jose V Chen
(74) *Attorney, Agent, or Firm* — Westerman, Hattori, Daniels & Adrian, LLP (57) ABSTRACT

A tilting table device includes a first rotary member which is rotated by a rotation amount equivalent to that of a tilt shaft when rotation of the tilt shaft is transmitted; a second rotary member which has an axis parallel to that of the first rotary member and is rotated by a rotation amount equivalent to or substantially equivalent to that of the first rotary member in a direction opposite to that of the first rotary member when the rotation of the first rotary member is transmitted; two retaining members respectively provided at the first and second rotary members, in which when the center of gravity of a table is located at an uppermost position or a lowermost position, the retaining members are located on or near a line connecting rotation centers of the first and second rotary members, the retaining members are located at equivalent or substantially equivalent distances respectively from the rotation centers, both the retaining members are provided inside or outside the two rotation centers; and an urging device which causes a constant urging force to be applied between the two retaining members so as to reduce a torque applied to the tilt shaft by movement of the center of gravity from the uppermost position or the lowermost position as a result of the rotation of the tilt shaft.

5 Claims, 7 Drawing Sheets

U.S. PATENT DOCUMENTS

| | | | | |
|---|---|---|---|---|
| 2,584,921 | A | * | 2/1952 | Rawnsley et al. ............. 248/364 |
| 2,988,843 | A | * | 6/1961 | Knudsen ............................ 108/2 |
| 3,267,878 | A | * | 8/1966 | Faux et al. ......................... 108/2 |
| 3,903,812 | A | * | 9/1975 | Cowley .............................. 108/2 |
| 3,908,560 | A | * | 9/1975 | Horner ............................... 108/2 |
| 4,434,721 | A | * | 3/1984 | Shelton et al. .................... 108/4 |
| 4,462,579 | A | * | 7/1984 | Satake ............................... 108/7 |
| 4,768,762 | A | * | 9/1988 | Lund ................................. 108/2 |
| 5,469,793 | A | * | 11/1995 | Lindsay ............................ 108/2 |
| 5,605,101 | A | * | 2/1997 | Lindsay ............................ 108/7 |
| 7,296,778 | B2 | * | 11/2007 | Lindsay .................... 248/372.1 |
| 7,588,378 | B2 | * | 9/2009 | Kistner ..................... 248/372.1 |

FOREIGN PATENT DOCUMENTS

| | | |
|---|---|---|
| JP | 2002-066852 A | 3/2002 |
| JP | 2006-150539 A | 6/2006 |

* cited by examiner

TILTING TABLE DEVICE

TECHNICAL FIELD

The present invention is a technique relating to a tilting table device. In particular, the present invention relates to a technique provided in a tilting table device which includes a body frame, a table, and a tilt shaft rotationally driven to tilt the table, in which the tilt shaft is rotatably supported by the body frame, and the table is supported by the body frame via the tilt shaft. With the technique, when the table is rotated from a condition in which the center of gravity is at an uppermost position or a lowermost position, the center of gravity of the table is moved away from the axis center of the tilt shaft, so that a torque caused by the gravity of the table and applied to the tilt shaft is reduced.

BACKGROUND ART

In order to reduce a torque to be applied to a tilt shaft of a tilting table device, publications of Patent Documents 1 and 2 each disclose a configuration provided with a torque balance device. The torque balance device includes a first rotary member provided at the tilt shaft, a second rotary member provided at a body frame, a fluid-pressure cylinder device, and a crank mechanism which converts an urging force of the fluid-pressure cylinder device into a rotational force of the second rotary member. The rotary force of the second rotary member caused by the urging force of the fluid-pressure cylinder device via the crank mechanism is transmitted to the first rotary member through meshing of gears, or through a rotation transmitting device, such as a timing belt or a chain, so that a torque in an opposite direction to that of the torque caused by the gravity of the table is applied to the tilt shaft, thereby reducing a torque to be applied to the tilt shaft. Accordingly, when the table is elevated, a load to be applied to a driving motor or a manual handle is reduced, and the table is kept in resting state at an intermediate position between the uppermost position and the lowermost position. Thus, when the table is kept at a predetermined tilt angle, loads to be applied to a rotation transmitting device, such as a gear, a shaft, and a coupler, to the tilt shaft, and to a clamp device can be reduced. Accordingly, a driving motor of a smaller frame number may be used, and the manual handle can be rotated by a smaller force. Also, the margin of safety of the rotation transmitting device against breakage and wearing is increased to a level equal to or higher than the necessary level, and hence, a member having a smaller rigidity may be used. Also, the clamp device may be a device having a smaller clamping force. Further, torsion of the tilt shaft is reduced, thereby providing highly accurate indexing.

[Patent Document 1] Japanese Unexamined Patent Application Publication No. 2000-301405

[Patent Document 2] Japanese Unexamined Patent Application Publication No. 2005-246522

DISCLOSURE OF INVENTION

Problems to be Solved by the Invention

However, in the device disclosed in Patent Documents 1 and 2, it is necessary to change the urging force of the fluid-pressure cylinder device in accordance with the tilt angle of the table. When the tilt angle is 0°, that is, when the center of gravity of the table is at the uppermost position or the lowermost position, the center of gravity is located on a vertical line passing through the tile shaft, and hence, the gravity does not cause the torque to be applied to the tilt shaft, resulting in the fluid-pressure cylinder device not being urged. As the tilt angle is increased, the center of gravity is moved away from the vertical line, and the gravity causes the torque, which is proportional to the distance between the vertical line of the tilt shaft and the center of gravity, to be applied to the tilt shaft. When the tilt angle is 90°, the center of gravity is moved away from the vertical line by a maximum distance, so that the gravity causes a maximum torque to be applied to the tilt shaft. As described above, since the torque caused by the gravity varies in accordance with the tilt angle, it is necessary to control the fluid pressure to be supplied to the fluid-pressure cylinder device in accordance with the tilt angle, and it is necessary to control the urging force of the urging device in accordance with the tilt angle.

In light of the above-described problems of the related techniques, an object of the present invention is to provide a tilting table device having an urging device, which reduces a torque caused by a gravity of a table and applied to a tilt shaft, the urging device being capable of changing a torque caused by the urging force and applied to the tilt shaft in accordance with a tilt angle, and thus, being capable of reducing a torque caused by the gravity of the table and applied to the tilt shaft while the urging force is kept substantially constant.

Means for Solving the Problems

The present invention is made to attain the above-described object, and provides a tilting table device including a body frame, a table, and a tilt shaft which is rotationally driven to tilt the table, the tilt shaft being rotatably supported by the body frame, the table being supported by the body frame via the tilt shaft. The tilting table device includes a first rotary member which is rotated by a rotation amount equivalent to that of the tilt shaft when the rotation of the tilt shaft is transmitted; a second rotary member which has an axis parallel to that of the first rotary member and is rotated by a rotation amount equivalent to or substantially equivalent to that of the first rotary member in a direction opposite to that of the first rotary member when the rotation of the first rotary member is transmitted; two retaining members respectively provided at the first and second rotary members, in which when the center of gravity of the table is located at an uppermost position or a lowermost position, the retaining members are located on or near a line connecting rotation centers of the first and second rotary members, the retaining members are located at equivalent or substantially equivalent distances respectively from the rotation centers, both the retaining members are provided inside or outside the two rotation centers; and an urging device which causes, a constant urging force to be applied between the two retaining members so as to reduce a torque applied to the tilt shaft by movement of the center of gravity from the uppermost position or the lowermost position as a result of the rotation of the tilt shaft (claim 1).

Also, the urging device includes a fluid-pressure cylinder device having a cylinder body and a piston which is slidably supported by the cylinder body and urged in a direction with a constant fluid pressure, the cylinder body being coupled to one of the first and second rotary members via the corresponding retaining member, the piston being coupled to another one of the first and second rotary members via the corresponding retaining member (claim 2).

Further, the first and second rotary members are formed as first and second gears which mesh with each other, the first gear being fixed to the tilt shaft, the second gear being rotatably provided at the body frame (claim 3).

Further, a third gear is supported by the tilt shaft at a position apart from the first gear in an axial direction, and a fourth gear is rotatably provided at the body frame at a position apart from the second gear in an axial direction, the third and forth gears meshing with each other, a gear ratio of the third and forth gears being equivalent to a gear ratio of the first and second gears, the fluid-pressure cylinder device being provided between the gears apart from each other in the axial direction, the one of the cylinder body and the piston being supported by the first and third gears via the retaining member, the another one of the cylinder body and the piston being supported by the second and fourth gears via the retaining member (claim 4).

Further, the base is fixed to the tilt shaft. The table is supported by the body frame via the tilt shaft and the base, and the table includes the tilt shaft which is hollow, a shaft member which is relatively rotatably inserted through the tilt shaft, a motor having a motor shaft coupled to the shaft member and a motor body fixed to the gear supported by the tilt shaft, and a rotation transmitting device provided at the base and coupled to the shaft member, the motor being configured to rotate the table via the shaft member and the rotation transmitting device (claim 5).

ADVANTAGES

The tilting table device includes the first rotary member which is rotated by the rotation amount equivalent to that of the tilt shaft, in particular, by the rotation amount in terms of angle equivalent to that of the tilt shaft when the rotation of the tilt shaft is transmitted; the second rotary member which is rotated by the rotation amount equivalent to or substantially equivalent to that of the first rotary member in the direction opposite to that of the first rotary member when the rotation of the first rotary member, that is, the rotation of the tilt shaft is transmitted; the two retaining members respectively provided at the first and second rotary members, in which when the center of gravity of the table is located at the uppermost position or the lowermost position, the retaining members are located on or near the line connecting the rotation centers of the first and second rotary members, the retaining members are located at the equivalent or substantially equivalent distances respectively from the rotation centers, both the retaining members are provided inside or outside the two rotation centers; and the urging device which causes the constant urging force to be applied between the two retaining members so as to reduce the torque applied to the tilt shaft by movement of the center of gravity from the uppermost position or the lowermost position as a result of the rotation of the tilt shaft. Accordingly, the two retaining members are moved by the rotation of the tilt shaft. Also, the two retaining members are located on a side, to which the center of gravity of the table is moved, or on a side opposite to the moving side of the center of gravity, with respect to the line connecting the rotation centers.

In particular, when the center of gravity of the table is located at the uppermost position or the lowermost position, if the two retaining members are located on or near the line connecting the rotation centers of the first and second rotary members, and are also located inside the two rotation centers, the two retaining members are moved together with the first and second rotary members, and are located on the side, to which the center of gravity of the table is moved, with respect to the above-mentioned line. If the two retaining members are located outside the two rotation centers, the two retaining members are moved together with the first and second rotary members, and are located on the side opposite to the moving side of the center of gravity of the table, with respect to the above-mentioned line.

The urging force applied between the two retaining members is applied so as to reduce the torque which is applied to the tilt shaft by the movement of the center of gravity from the uppermost position or the lowermost position as a result of the rotation of the tilt shaft. In particular, when the center of gravity of the table is located at the uppermost position or the lowermost position, if the two retaining members are located on or near the line connecting the rotation centers of the first and second rotary members, and are also located inside the two rotation centers, the two retaining members are located on the side, to which the center of gravity is moved, with respect to the above-mentioned line, by the movement of the center of gravity. Hence, by applying an urging force in a direction to move the two retaining member away from each other, the torque caused by the gravity and applied to the tilt shaft can be reduced. A torque applied to the second rotary member via the retaining member of the second rotary member caused by an urging force in a direction opposite to that of the retaining member of the first rotary member is applied in a direction opposite to that of the torque applied to the first rotary member caused by the retaining member of the first rotary member. Hence, similarly to the torque caused by the retaining member of the first rotary member, the torque is applied to the tilt shaft in a direction to reduce the torque caused by the gravity and applied to the tilt shaft. When the two retaining members are located outside the two rotation centers, the two retaining members are located on the side opposite to the moving side of the center of the gravity with respect to the above-mentioned line by the movement of the center of gravity. Hence, by applying an urging force in the direction to move the two retaining members close to each other, that is, an urging force to attract the two retaining members to each other, the torque caused by the gravity and applied to the tilt shaft is reduced. As described above, merely by keeping the urging force to the constant value with the urging device, the torque applied to the tilt shaft can be reduced in the necessary tilting range. Thus, it is not necessary to control the urging force in accordance with the tilt angle.

With claim 2, the urging device includes the fluid-pressure cylinder device having the cylinder body and the piston which is slidably supported by the cylinder body and urged in the direction with the constant fluid pressure, the cylinder body being coupled to one of the first and second rotary members via the corresponding retaining member, the piston being coupled to another one of the first and second rotary members via the corresponding retaining member. Accordingly, it is not necessary to change the fluid pressure to be supplied to the fluid-pressure cylinder device in accordance with the tilting of the center of gravity of the table from the uppermost position or the lowermost position, that is, in accordance with the tilt angle of the table. The torque caused by the gravity and applied to the tilt shaft is easily reduced.

With claim 3, the first and second rotary members are formed as the first and second gears which mesh with each other, the first gear being fixed to the tilt shaft, the second gear being rotatably provided at the body frame. Accordingly, since the second rotary member meshes with the first rotary member, the rotation is transmitted to the second rotary member, and the second rotary member can be rotated in the direction opposite to the direction of the first rotary member.

With claim 4, the third gear is supported by the tilt shaft at the position apart from the first gear in the axial direction, and the fourth gear is rotatably provided at the body frame at the position apart from the second gear in the axial direction, the third and forth gears meshing with each other, the gear ratio of the third and forth gears being equivalent to the gear ratio of the first and second gears, the fluid-pressure cylinder device being provided between the gears apart from each other in the axial direction, the one of the cylinder body and the piston being supported by the first and third gears via the retaining member, the another one of the cylinder body and the piston being supported by the second and fourth gears via the retaining member. Accordingly, the cylinder body and the piston are stably supported from both sides, and the cylinder body and the piston are supported without rotation thereof being restricted relative to the gears. Since the gear ratio of the third and forth gears are equivalent to the gear ratio of the first and second gears, relative rotation is not held between the first and third gears, or between the second and fourth gears. Thus, the cylinder body and the piston each are stably supported by the two gears.

With claim 5, the base is fixed to the tilt shaft. The table is supported by the body frame via the tilt shaft and the base, and the table includes the tilt shaft which is hollow, the shaft member which is relatively rotatably inserted through the tilt shaft, the motor having the motor shaft coupled to the shaft member and the motor body fixed to the gear supported by the tilt shaft, and the rotation transmitting device provided at the base and coupled to the shaft member, the motor being configured to rotate the table via the shaft member and the rotation transmitting device. Accordingly, even when the tilt shaft is rotated, relative rotation is not held between the mortor and the table. Thus, an original position does not have to be corrected for each tilt angle, thereby providing accurate indexing of a workpiece.

REFERENCE NUMERALS

1 body frame
1a frame A
1b frame B
1c frame C
2 base
3 table
4 driving tilt shaft
5 supporting tilt shaft
6 driving motor
7 first gear
8 second gear
8a gear pin
9 third gear
10 fourth gear
10a gear pin
11 hydraulic cylinder
11a cylinder body
11aa pin supporter
11b piston rod
12 gear bracket
13 retaining pin
14 retaining pin
15 table motor
15a motor body
15b motor shaft
16 gear base
17 hose
18 shaft
19 coupler
20 bearing
21 bearing
22 timing belt pulley
23 timing belt
24 gear pin
25 bearing
28 machine tool table
50 tilting table device
51 rotation transmitting device
60 tilting table device
62 retaining pin
63 rod end
64 pneumatic cylinder
64a cylinder body
64b piston rod
64c gas charge port
65 pressure gage
66 adjustment bolt
67 partition plate
68 retaining pin
70 tilting table device
72 retaining pin
73 retaining pin
74 motor holder
75 hoisting motor
76 hoisting drum
77 extension spring
78 rope 7
80 tilting table device
82 retaining pin
83 retaining pin
85 pulley
86 rope
87 balance weight
G center of gravity
W gravity
T gravity

BEST MODES FOR CARRYING OUT THE INVENTION

Figure 1:
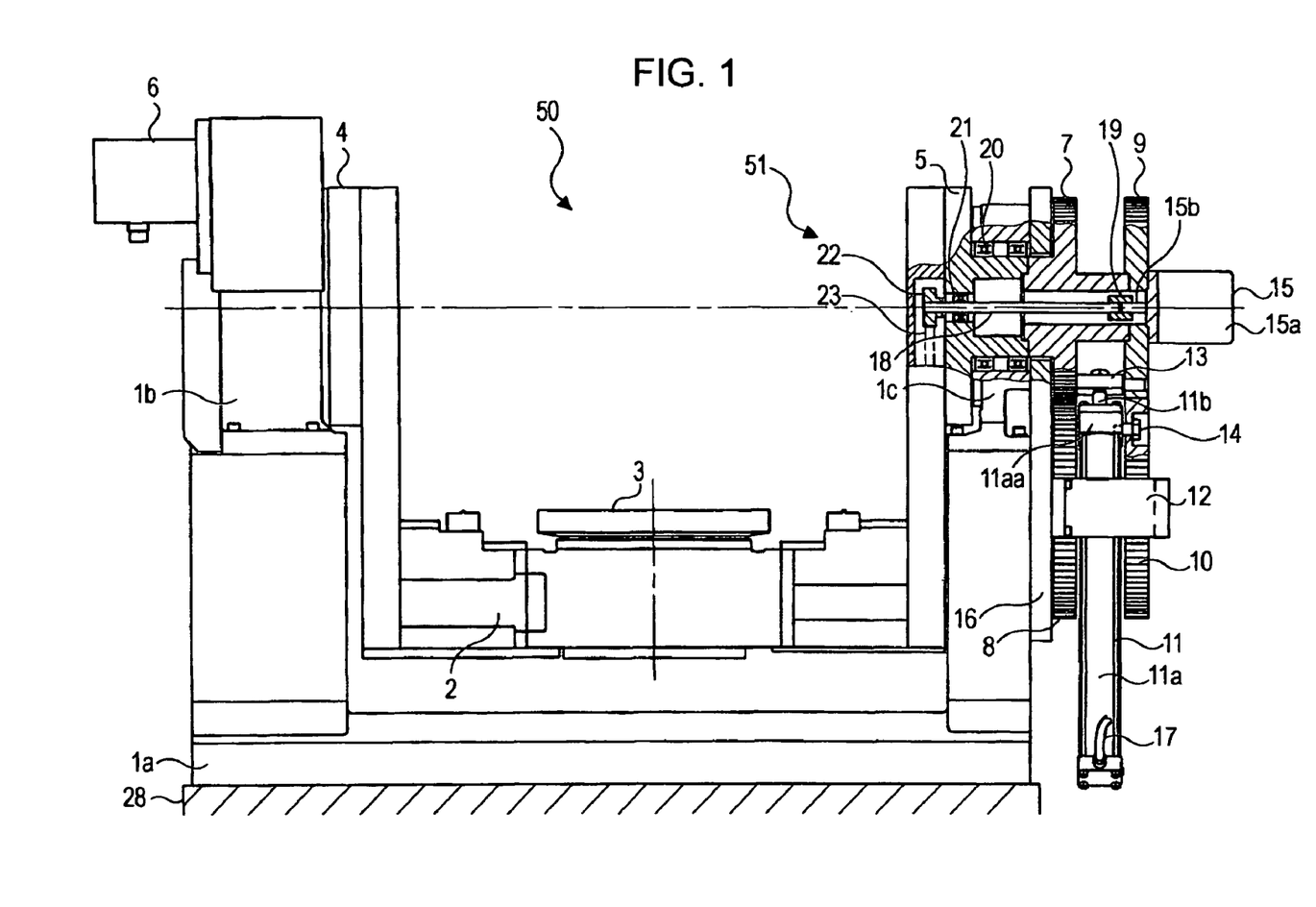
FIG. 1 is an overview of a tilting table device 50 according to a first embodiment of the present invention, the overview partly involving a cross-sectional view.
Figure 2:
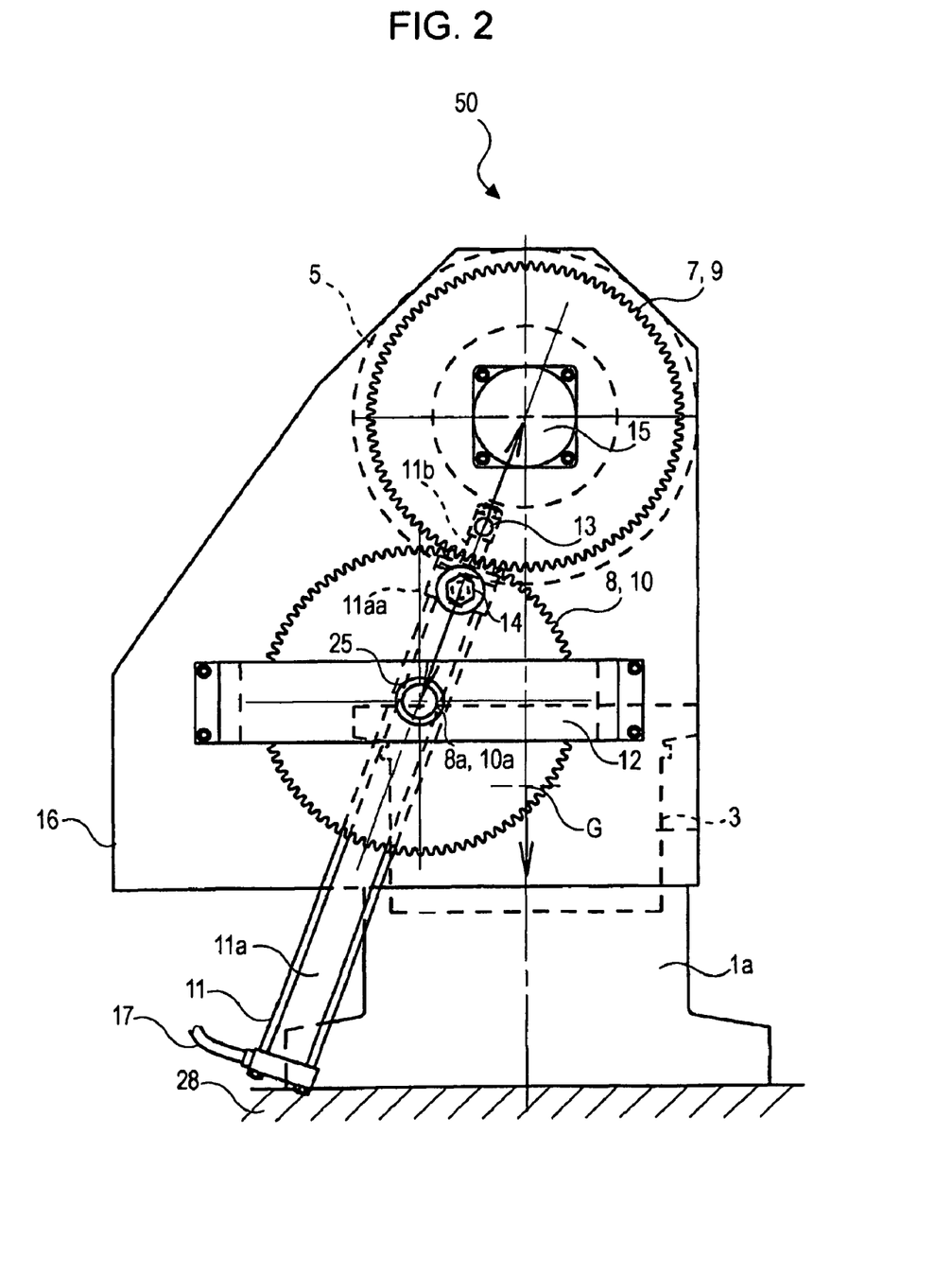
FIG. 2 is a right side view of FIG. 1, showing a condition of tilt angle θ=0° when the center of gravity G of a base 2 and a table 3 is located at a lowermost position.
Figure 3:
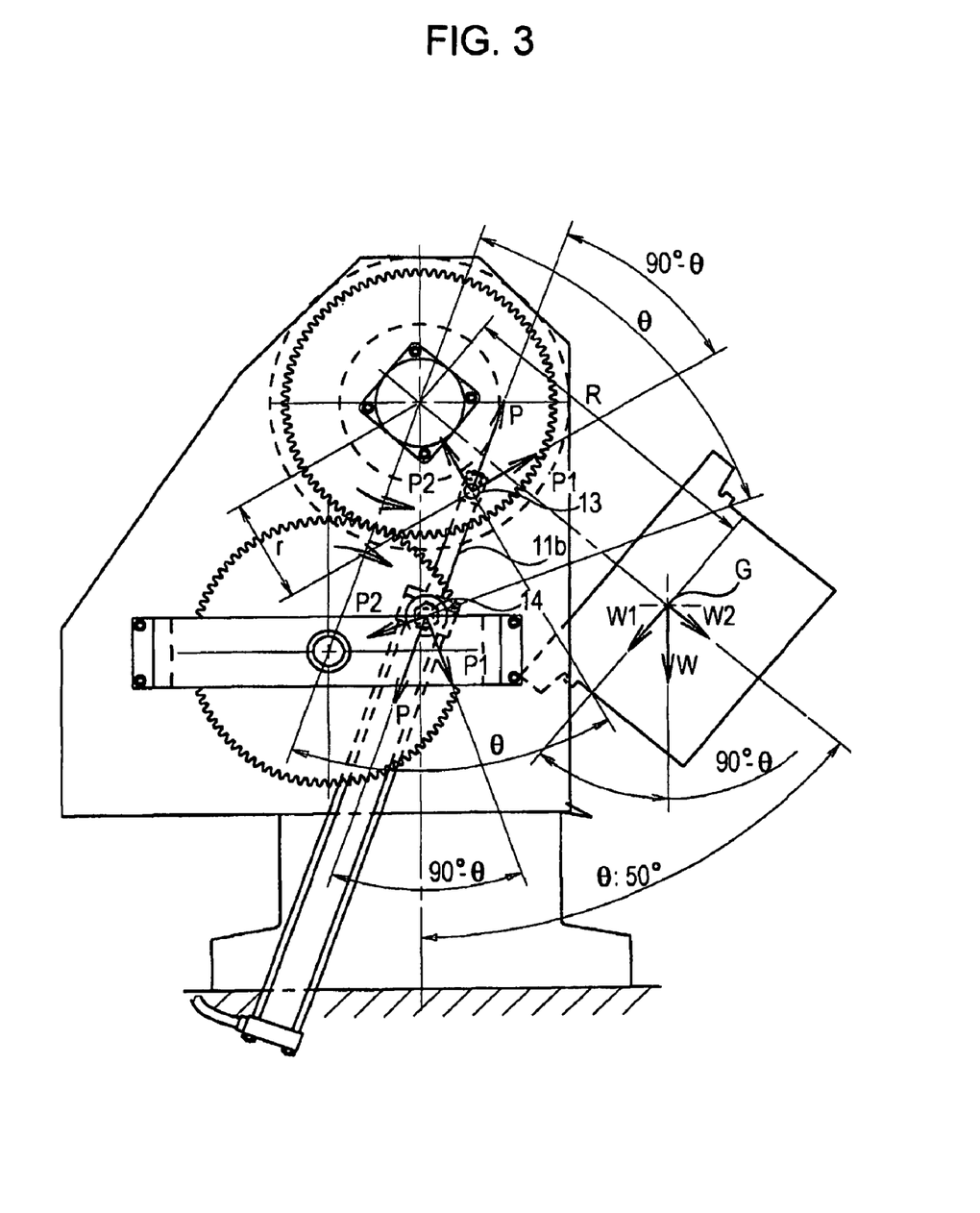
FIG. 3 shows a condition of tilt angle θ=50° when the center of gravity G of the base 2 and the table 3 is rotated counterclockwise, with respect to FIG. 2.
Figure 4:
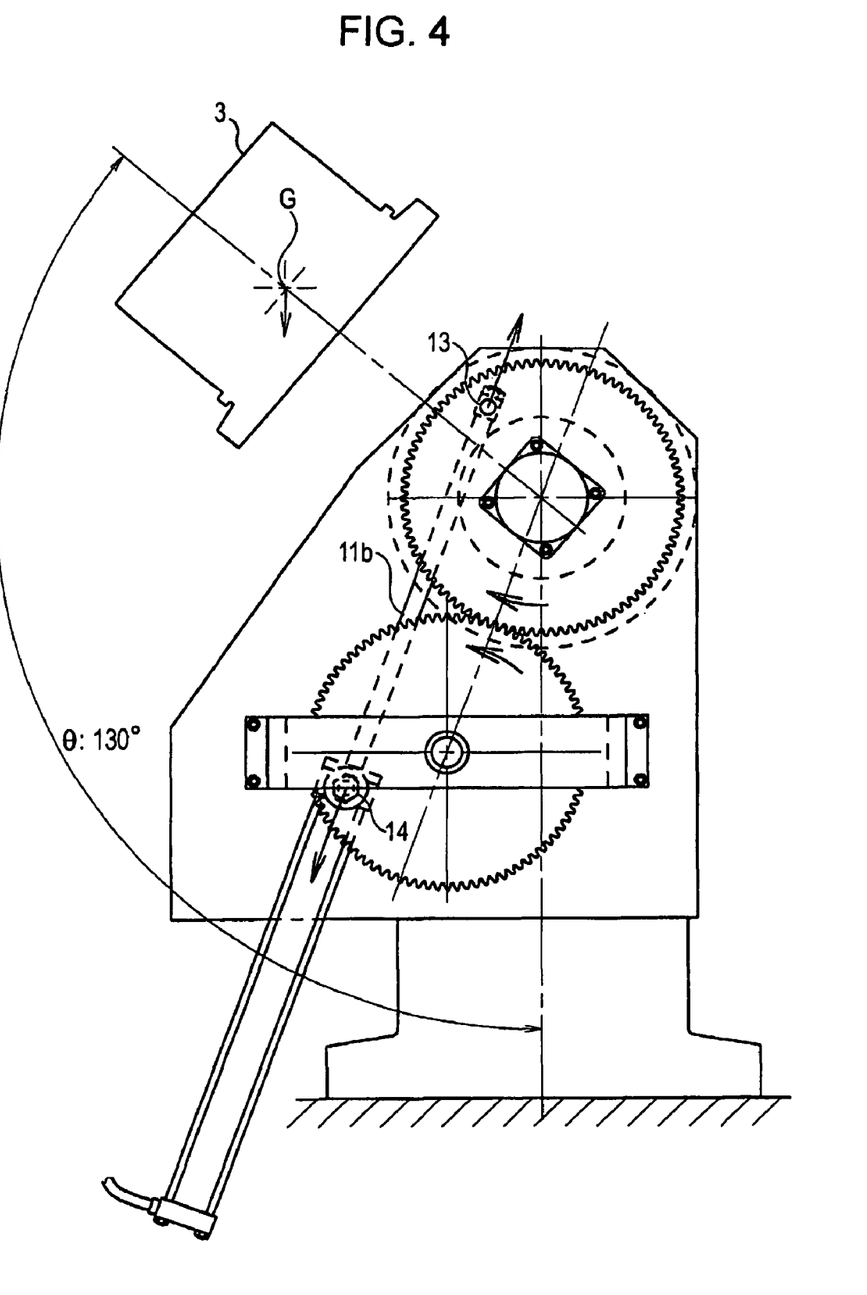
FIG. 4 shows a condition of tilt angle θ=130° when the center of gravity G of the base 2 and the table 3 is rotated clockwise, with respect to FIG. 2.

Hereinafter, embodiments of the present invention are described with reference to the attached drawings. FIGS. 1 to 4 each illustrate a tilting table device 50 according to a first embodiment of the present invention. FIG. 1 is an overview of the tilting table device 50, the overview partly involving a cross-sectional view. FIGS. 2, 3, and 4 each illustrate a right side view of FIG. 1. FIG. 2 shows a condition of tilt angle θ=0° when the center of gravity G of a base 2 and a table 3 is at a lowermost position, the table 3 being rotatably supported by the base 2. FIG. 3 shows a condition of tilt angle θ=−50° when the center of gravity G is rotated clockwise, or tilt angle θ=50° when the center of gravity G is rotated counterclockwise. FIG. 4 shows a condition of tilt angle θ=130° when the center of gravity G is rotated clockwise.

The tilting table device 50 of this embodiment includes a body frame 1. The body frame 1 includes a U-shaped frame A 1a which is fixed to a machine tool table 28, a frame B 1b on which a driving motor 6 is mounted, and which rotatably supports a driving tilt shaft 4, and a frame C 1c which rotatably supports a supporting tilt shaft 5. The frame B 1b and the frame C 1c are respectively fixed to ends of the frame A 1a with bolts. The driving tilt shaft 4 has a coupler. The driving tilt shaft 4 is coupled to the driving motor 6 via the coupler and a drive transmitting device (not shown) containing, for example, a gear, and hence, is rotated by the driving motor 6. The base 2 having a U-shape is provided. Ends of the base 2 are respectively fixed to the driving tilt shaft 4 and the supporting tilt shaft 5, so that the driving tilt shaft 4 and the supporting tilt shaft 5 are integrally formed via the base 2.

The table 3 on which a workpiece is placed is rotatably supported at a center portion of the base 2. Also, the base 2 has a rotation transmitting device 51 of the table 3. A gear base 16 is fixed to side surfaces of the frame A 1a and the frame C 1c with bolts. A U-shaped gear bracket 12 is fixed to the gear base 16 at both ends of the gear bracket 12 with bolts. The supporting tilt shaft 5 has a through-hole formed in an axial direction at the axis center thereof, and thus the supporting tilt shaft 5 is hollow. A bearing 20, which is fitted into a bearing support hole of the frame C 1c, is fitted onto an outer circumferential surface of the supporting tilt shaft 5 such that the supporting tilt shaft 5 is rotatably supported. A bearing 21 is fitted onto an inner circumferential surface of the supporting tilt shaft 5 such that the supporting tilt shaft 5 rotatably supports an end of a shaft 18, which is fitted onto an inner circumferential surface of the bearing 21. A first gear 7, which serves as a first gear, is fixed to an end of the supporting tilt shaft 5 opposite to the base 2 with a bolt (not shown). The first gear 7 has a through-hole at the axis center thereof. The first gear 7 has a boss portion at a position on a side opposite to the supporting tilt shaft 5. A third gear 9, which serves as a third gear, is fixed to an end of the boss portion with a bolt (not shown). The third gear 9 has a through-hole at the axis center thereof, and has teeth, the number of which is equivalent to that of the first gear 7. Facing surfaces of the first gear 7 and the third gear 9 are separated from each other in the axial direction because of the boss portion, and hence, a space is formed between the facing surfaces.

A table motor 15 is coaxially provided at an end of the third gear 9 opposite to the first gear 7. The table motor 15 rotates the table 3 relative to the base 2. The table motor 15 has a motor body 15a which is fixed to the third gear 9, and a motor shaft 15b which is inserted through the through-holes of the third gear 9 and the first gear 7 and is coupled to another end of the shaft 18 via a coupler 19. The shaft 18 protrudes from the supporting tilt shaft 5 and extends to a space containing the rotation transmitting device 51 of the table 3 provided at the base 2. A timing belt pulley 22, which forms the rotation transmitting device 51, is fixed to the shaft 18. The timing belt pulley 22 is coupled to a timing belt pulley (not shown) via a timing belt 23. The timing belt pulley 22 and the timing belt 23, together with the timing belt pulley, a bearing, a shaft, a worm shaft, a worm wheel, and other components, which are not shown, form the rotation transmitting device 51 of the table 3.

The gear base 16 has a through-hole, into which a bearing 25 is fitted. The bearing 25 rotatably supports a second gear 8, which serves as a second gear. The second gear 8 has teeth, the number of which is equivalent to that of the first gear 7. The second gear 8 meshes with the first gear 7. More specifically, a gear pin 8a is formed at the axis center of the second gear 8, and the gear pin 8a is inserted through the bearing 25. Hence, the second gear 8 is rotatably supported by the gear base 16 via the bearing 25. That is, the second gear 8 is rotatably supported by the body frame 1. The gear bracket 12 has a through-hole at a center portion thereof. A bearing 25 is fitted into the through-hole. The bearing 25 rotatably supports a fourth gear 10, which serves as a fourth gear. The fourth gear 10 has teeth, the number of which is equivalent to that of the third gear 9, that is, is equivalent to those of the first gear 7, the second gear 8, and the third gear 9. The fourth gear 10 meshes with the third gear 9. More specifically, the fourth gear 10 has a gear pin 10a at the axis center thereof, and the gear pin 10a is inserted from the side of the second gear 8 into the bearing 25. The fourth gear 10 is rotatably supported by the gear bracket 12 via the bearing 25. The gear bracket 12 is attached to the gear base 16 such that the axis center of the bearing 25 fitted to the gear bracket 12 becomes coaxial with the axis center of the bearing 25 fitted into the gear base 16. Hence, the second gear 8 and the fourth gear 10 are coaxially provided.

A fluid-pressure cylinder device, which serves as an urging device, is provided between facing surfaces of the first gear 7 and the third gear 9 and between facing surfaces of the second gear 8 and the fourth gear 10. The fluid-pressure cylinder device includes a hydraulic cylinder 11 having a cylinder body 11a and a piston rod 11b. One of the cylinder body 11a and the piston rod 11b of the hydraulic cylinder 11 is supported by the first gear 7 and the third gear 9 via a retaining member, and another one is supported by the second gear 8 and the fourth gear 10 via a retaining member. In this embodiment, the cylinder body 11a is supported by the second gear 8 and the fourth gear 10, and the piston rod 11b is supported by the first gear 7 and the third gear 9. More specifically, the cylinder body 11a has a pin supporter 11aa at an end thereof near the protruding piston rod 11b. The pin supporter 11aa has retaining holes in surfaces thereof facing the second gear 8 and the fourth gear 10. Retaining pins 14, as retaining members, are fixed to the second gear 8 and the fourth gear 10, and are respectively inserted into the retaining holes. Accordingly, the cylinder body 11a is supported in a so-called doubly supported manner, and is rotatably supported relative to the second gear 8 and the fourth gear 10.

An end of the piston rod 11b is formed as a small-diameter step portion. A retaining pin 13 is fixed to the small-diameter step portion via a nut. The retaining pin 13 is provided as a retaining member, and extends in the axial direction of the first gear 7 and the third gear 9. The retaining pin 13 has retaining protrusions respectively at an end thereof near the first gear 7 and at an end thereof near the third gear 9. The retaining protrusions are respectively inserted through through-holes formed in the first gear 7 and the third gear 9. Accordingly, the piston rod 11b is supported in a so-called doubly supported manner, and is rotatably supported relative to the first gear 7 and the third gear 9.

The through-hole of the first gear 7, the through-hole of the third gear 9, the retaining pin 14 of the second gear 8, and the retaining pin 14 of the fourth gear 10 are provided at even distances in a radial direction from the axis centers, that is, from the rotation centers of the gears 7, 8, 9, and 10. Since the numbers of teeth of the second gear 8 and the fourth gear 10 are equivalent to the numbers of teeth of the first gear 7 and the third gear 9 as described above, the second gear 8 and the fourth gear 10 are rotated in an opposite direction to a rotation direction of the tilt shafts 4 and 5, the base 2, the table 3, the first gear 7, and the third gear 9, by an equivalent rotation amount, that is, by an equivalent rotation angle, from a reference position.

A hose 17 is connected to an end of the cylinder body 11a opposite to the end thereof near the protruding piston rod 11b. Working fluid is supplied through the hose 17 from a hydraulic driving device (not shown) to the hydraulic cylinder 11. The working fluid is supplied to the hydraulic cylinder 11 such that the pressure of the working fluid is kept to a constant pressure by a member capable of adjusting the pressure, such as a balancing valve (not shown).

In this embodiment, the rotation center of the tilt shafts 4 and 5, the second gear 8 and the fourth gear 10 is not located on a vertical line passing through the rotation center of the first gear 7 and the third gear 9 so that a tilting range in one direction becomes larger than a tilting range in another direction, in a tilting range of the base 2 and the table 3. In this embodiment, referring to FIG. 2, the rotation center of the second gear 8 and the fourth gear 10 is located on the left side of the vertical line so that a clockwise tilting range becomes larger than a counterclockwise tilting range.

When the center of gravity G of the base 2 and the table 3 shown in FIG. 2 is located at the lowermost position, that is, at a reference position of tilt angle $\theta=0°$, the retaining pins 13 and 14 are located on a straight line connecting the rotation center of the first gear 7, which serves as a first rotary member, and the rotation center of the second gear 8, which serves as a second rotary member. Also, the retaining pins 13 and 14 are located inside the two rotation centers. In this state, working fluid with a predetermined pressure is supplied from the hydraulic driving device (not shown) to the hydraulic cylinder 11. The piston rod 11b is urged, thereby causing a force in an arrow direction to be applied to the retaining pin 13. A reaction force of the piston rod 11b is generated at the cylinder body 11a which supports the piston rod 11b. The reaction force causes a force in an arrow direction to be applied to the retaining pin 14 which supports the cylinder body 11a. The forces caused by the urging force of the hydraulic cylinder 11 are applied only in a radial direction. Hence, no rotational force, that is, no torque is generated at the first gear 7 and the second gear 8. Also, when the base 2 and the table 3 are located at the reference position, a gravity W of the base 2 and the table 3 is a force applied to the tilt shafts 4 and 5 merely in a radial direction. Hence, no torque is generated at the tilt shafts 4 and 5 by the gravity W of the base 2 and the table 3.

FIG. 3 illustrates a condition in which the driving motor 6 is driven, the tilt shafts 4 and 5 are rotated, the base 2 and the table 3 are rotated counterclockwise from the reference position at tilt angle $\theta=0°$ in FIG. 2, and the tilt angle is kept at tilt angle $\theta=50°$. The retaining pin 13 is rotated together with the first gear 7 and the third gear 9, and is rotated counterclockwise by the tilt angle=50°. The retaining pin 14 is rotated together with the second gear 8 and the fourth gear 10, which mesh with and are driven by the first gear 7 and the third gear 9. Since the gears 7, 8, 9, and 10 have the equivalent numbers of teeth, the retaining pin 14 is rotated clockwise by the tilt angle $\theta=50°$. Accordingly, the retaining pins 13 and 14 are located on a side, to which the center of gravity G of the base 2 and the table 3 moves, with respect to the straight line connecting the rotation centers of the first and second gears 7 and 8. Also, since the retaining pins 13 and 14 are located at the positions at the equivalent distance from the respective rotation centers, the retaining pins 13 and 14 are apart from the straight line connecting the rotation centers of the first and second gears 7 and 8 by equivalent distances. Thus, a straight line connecting the retaining pins 13 and 14 becomes parallel to the straight line connecting the rotation centers of the first and second gears 7 and 8.

A component force, which is contained in the gravity W of the base 2 and the table 3 and is applied in a tangential direction of a circle centering at the rotation center of the tilt shafts 4 and 5, corresponds to a value obtained by multiplying the gravity W by a sin value of $\theta$, that is, $W \times \sin \theta$. Thus, a torque caused by the gravity W and applied to the tilt shafts 4 and 5 is obtained by $R \times W \times \sin \theta$, where R is a distance of the center of gravity G from the rotation center of the tilt shafts 4 and 5. Meanwhile, component forces, which are contained in an urging force P applied from the hydraulic cylinder 11 via the retaining pin 13 to the first gear 7 and the third gear 9, and in an urging force P applied from the hydraulic cylinder 11 via the retaining pin 14 to the second gear 8 and the fourth gear 10, and which are applied in tangential directions of circles centering at the rotation centers, correspond to values each being obtained by multiplying the urging force P by a sin value of $\theta$, that is, $P \times \sin \theta$. Thus, a torque caused by the urging force P of the retaining pin 13 and applied to the first gear 7 and the third gear 9 is obtained by $r \times P \times \sin \theta$, where r is a distance of the retaining pin 13 from the rotation center of the first gear 7 and the third gear 9. The torque is applied in an arrow direction illustrated at the third gear 9, that is, the torque is applied in an opposite direction to the direction of the torque of the gravity W. Also, a torque caused by the urging force P of the retaining pin 14 and applied to the second gear 8 and the fourth gear 10 is obtained by $r \times P \times \sin \theta$, where r is a distance of the retaining pin 14 from the rotation center of the second gear 8 and the fourth gear 10. The torque is applied in an arrow direction illustrated at the fourth gear 9, that is, the torque is applied in an opposite direction to the direction of the torque of the gravity W. Since the second gear 8 and the forth gear 10 mesh with the first gear 7 and the third gear 9, the torque applied to the second gear 8 and the fourth gear 10 is applied to the first gear 7 and the third gear 9 as a torque in the arrow direction illustrated at the third gear 9. Thus, the torque applied to the tilt shafts 4 and 5 is obtained by $R \times W \times \sin \theta - 2 \times r \times P \times \sin \theta = (R \times W - 2 \times r \times P) \sin \theta$. This operational expression represents that the torque applied to the tilt shafts 4 and 5 can be reduced at all tilt angle $\theta$ while the urging force P of the hydraulic cylinder 11 is kept substantially constant and the urging force P of the hydraulic cylinder 11 is not changed. That is, by properly setting and keeping the urging force P, the torque applied to the tilt shafts 4 and 5 can be reduced or eliminated in a desired range of the tilt angle $\theta$.

FIG. 4 illustrates a condition in which the driving motor 6 is driven, the tilt shafts 4 and 5 are rotated, the base 2 and the table 3 are rotated clockwise from the reference position of tilt angle $\theta=0°$ in FIG. 2, and the tilt angle is kept at tilt angle $\theta=130°$. Like FIG. 3, the straight line connecting the retaining pins 13 and 14 is parallel to the straight line connecting the rotation centers of the first and second gears 7 and 8.

The tilt shafts 4 and 5 are rotated by the driving motor 6; the first gear 7, the third gear 9, the table motor 15 provided at the third gear 9, the base 2, and the table 3 are rotated integrally with the tilt shafts 4 and 5; and the table 3 is kept at a predetermined tilt angle. Then, the table 3 is rotated by the table motor 15, and indexing of a workpiece is carried out. In this embodiment, since the table motor 15 is provided at the third gear 9, the table motor 15 is rotated integrally with the tilt shafts 4 and 5. Hence, the table motor 15 is moved integrally with the table 3 and the rotation transmitting device 51, and relative positions of these components are not changed. Accordingly, it is not necessary to set an original position of the table motor 15 for each tilt angle every indexing of a workpiece. Thus, machining accuracy of a workpiece can be enhanced.

In this embodiment, the first gear 7 as the first rotary member has the number of teeth equivalent to that of the second gear 8 as the second rotary member. However, these numbers of teeth may be different. For example, the number of a large gear may be equal to or smaller than a value 1.15 times the number of teeth of a small gear. For example, the number of teeth of the first gear 7 is 52, whereas the number of teeth of the second gear 8 is 61. As long as the number of teeth of the large gear is equal to or smaller than the value 1.15 times the number of teeth of the small gear, the reduction of the torque applied to the tilt shafts 4 and 5 is still achieved, that is, the torque applied to the tilt shafts 4 and 5 is not increased, in a necessary tilting range of the table 3, or in a desired range of the tilt angle θ. In particular, the first gear 7 and the second gear are rotated by substantially equivalent rotation amounts, and the rotation amounts do not significantly differ from each other. Similarly to the case in which these gears have the equivalent numbers of teeth, the torque applied to the tilt shafts 4 and 5 can be reduced. For example, when the number of teeth of the first gear 7 is 52 whereas the number of teeth of the second gear 8 is 61, the third gear 9 and the fourth gear 10 are arranged such that the number of teeth of the third gear 9 is 52 whereas the number of teeth of the fourth gear 10 is 61, so that the gear ratio of the third gear 9 and the forth gear 10 corresponds to the gear ratio of the first gear 7 and the second gear 8. Alternatively, the modules of the teeth of the third gear 9 and the fourth gear 10 may be differentiated from those of the first gear 7 and the second gear 8. For example, the modules of the third gear 9 and the fourth gear 10 are respectively set half the modules of the first gear 7 and the second gear 8, and the numbers of teeth of the third gear 9 and the fourth gear 10 are respectively set twice the numbers of teeth of the first gear 7 and the second gear 8 such that the number of teeth of the third gear 9 is 104 whereas the number of teeth of the fourth gear 10 is 122. With this arrangement, the center distance between the third gear 9 and the fourth gear 10 corresponds to the center distance between the first gear 7 and the second gear 8.

Also, in this embodiment, the retaining pins 13 and 14 are provided at the positions at the equivalent distances respectively from the rotation centers thereof. However, the retaining pins 13 and 14 do not have to be provided at the equivalent distances. In particular, as long as a large distance is equal to or smaller than a value 1.3 times a small distance, the distances may be substantially equivalent to each other from the rotation centers, and the distances do not significantly differ from each other. Thus, the reduction of the torque applied to the tilt shafts 4 and 5 is still achieved in the necessary tilting range of the table 3.

Further, in this embodiment, the base 2, which rotatably supports the table 3, is provided, and the base 2 is fixed to the tilt shafts 4 and 5. The table 3 is supported by the body frame 1 via the base 2 in addition to the tilt shafts 4 and 5. However, the table 3 may be fixed to the tilt shafts 4 and 5, and the table 3 may be supported by the body frame 1 only via the tilt shafts 4 and 5. Thus, the present invention may be applied to a tilting table device of a type in which a table 3 is not rotated relative to tilt shafts 4 and 5.

Further, in this embodiment, the tilt shafts 4 and 5 are rotationally driven by the driving motor 6. However, the tilt shafts 4 and 5 may be rotationally driven by a manual handle. Thus, the present invention is applied to a tilting table device of a type in which tilt shafts 4 and 5 are rotationally driven manually.

Further, in this embodiment, the first gear 7 as the first rotary member is supported by the supporting tilt shaft 5. However, the first gear 7 may be supported by the driving tilt shaft 4. In such a case, the second gear 8 as the second rotary member is supported by a driving-side portion of the body frame 1, namely, the frame B 1b.

Further, in this embodiment, the first gear 7 as the first rotary member is supported on the tilt shafts 4 and 5, and the second gear 8 as the second rotary member is rotatably supported by the body frame 1. Hence, the urging device can be provided adjacent to the body frame 1. However, a drive transmitting device including, for example, a timing belt pulley, a timing belt, and a gear, may be provided, and the first gear 7 and the second gear 8 may be supported by other members. Accordingly, the installation space of the urging device can be more freely designed.

Further, in this embodiment, the first and second rotary members are gears which mesh with each other. However, the first and second rotary members may be two brackets having axes which are parallel to each other and serve as rotation centers. In such a case, one of the parallel axes is used as a tilting axis, or an axis rotated by a tilting axis. Gears are respectively provided at the parallel axes such that the gears mesh with each other. Accordingly, the two brackets are rotated in opposite directions.

Figure 5:
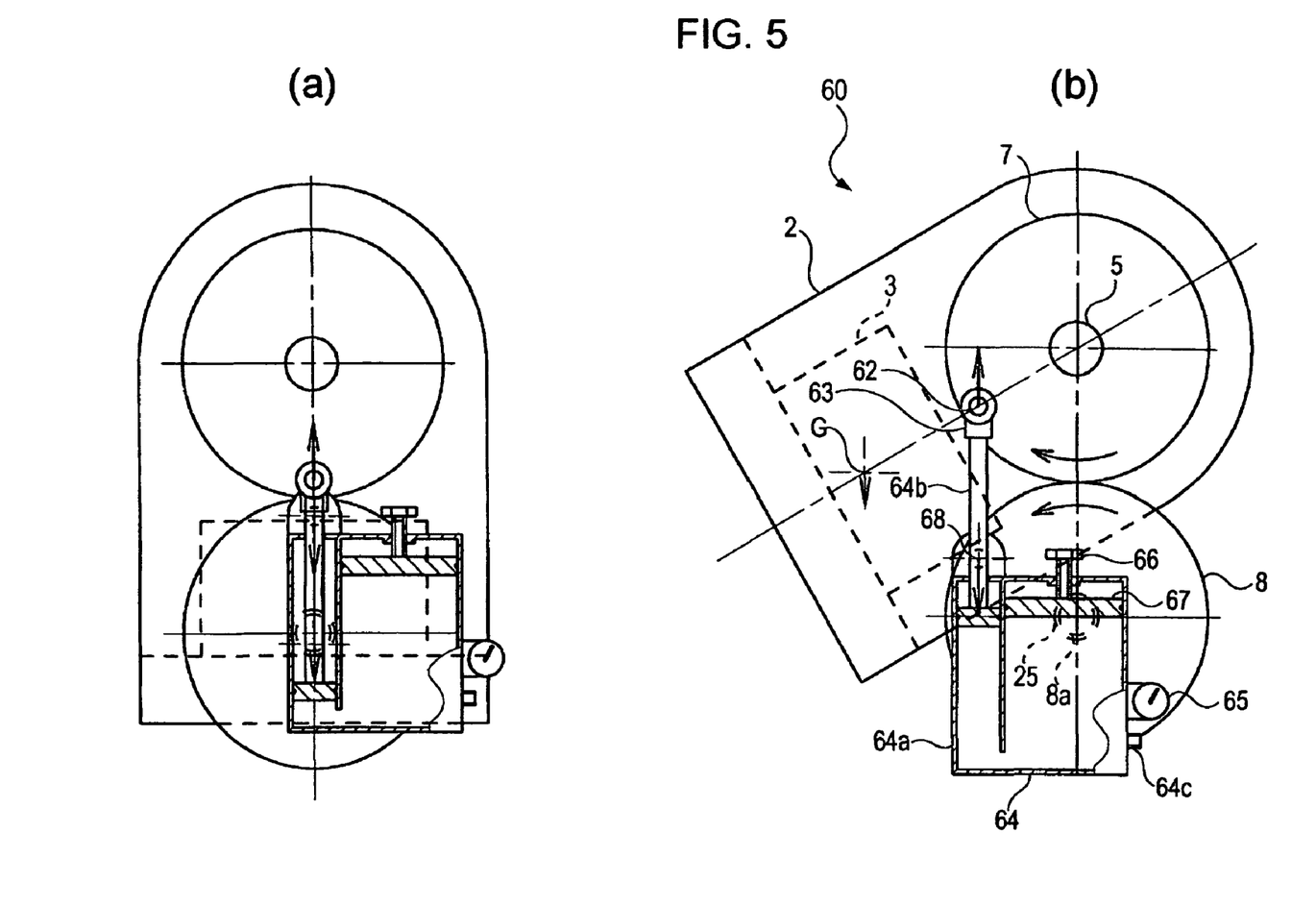
FIG. 5 illustrates a tilting table device 60 according to a second embodiment of the present invention.

FIG. 5 illustrates a tilting table device 60 according to a second embodiment of the present invention. In FIG. 5, part (a) shows a condition in which the center of gravity G of a base 2 and a table 3 is located at the lowermost position, that is, tilt angle θ=0°, and part (b) shows a condition in which tilt angle θ=60° when the center of gravity G is rotated clockwise.

The tilting table device 60 includes a first gear 7 serving as a first gear and fixed to a tilt shaft 5, a second gear 8 serving as a second gear, having a gear pin 8a at the axis center thereof, and being rotatably supported by a body frame via a bearing 25, a pneumatic cylinder 64 serving as a urging device and having a cylinder body 64a and a piston rod 64b, a retaining pin 62 serving as one retaining member and provided at the first gear 7, a retaining pin 68 serving as another retaining member and provided at the second gear 8, and a rod end 63 provided at a tip end of the piston rod 64b of the pneumatic cylinder 64.

The cylinder body 64a of the pneumatic cylinder 64 is relatively rotatably supported by the second gear 8 with the retaining pin 68. The piston rod 64b of the pneumatic cylinder 64 is relatively rotatably supported by the first gear 7 with the retaining pin 68 via the rod end 63. The pneumatic cylinder 64 has a pressure gage 65. For example, nitrogen gas is charged into the pneumatic cylinder 64 through a gas charge port 64c, and the position of a partition plate 67 is adjusted by an adjustment bolt 66. Hence, the gas pressure is adjusted to a predetermined pressure.

The piston rod 64b is urged by the gas pressure. An urging force is applied to the first gear 7 via the retaining pin 62 in an arrow direction in which the piston rod 64b protrudes from the cylinder body 64a. Meanwhile, a reaction force of the piston rod 64b is generated at the cylinder body 64a as an urging force in an arrow direction. The urging force is applied to the second gear 8 via the retaining pin 68.

When the tilt angle of the center of gravity G of the base 2 and the table 3 is changed, the protruding length of the piston rod 64b is changed. A volume ratio of a cylinder chamber in which the piston rod 64b slides in the cylinder body 64a is small, and hence, the change in pressure in the cylinder chamber in accordance with the change in the protruding length of the piston rod 64b is small. Thus, the urging force of the piston rod 64b is kept to a substantially predetermined urging force in all tilting range. A torque applied to the tilt shaft 5 can be reduced.

Figure 6:
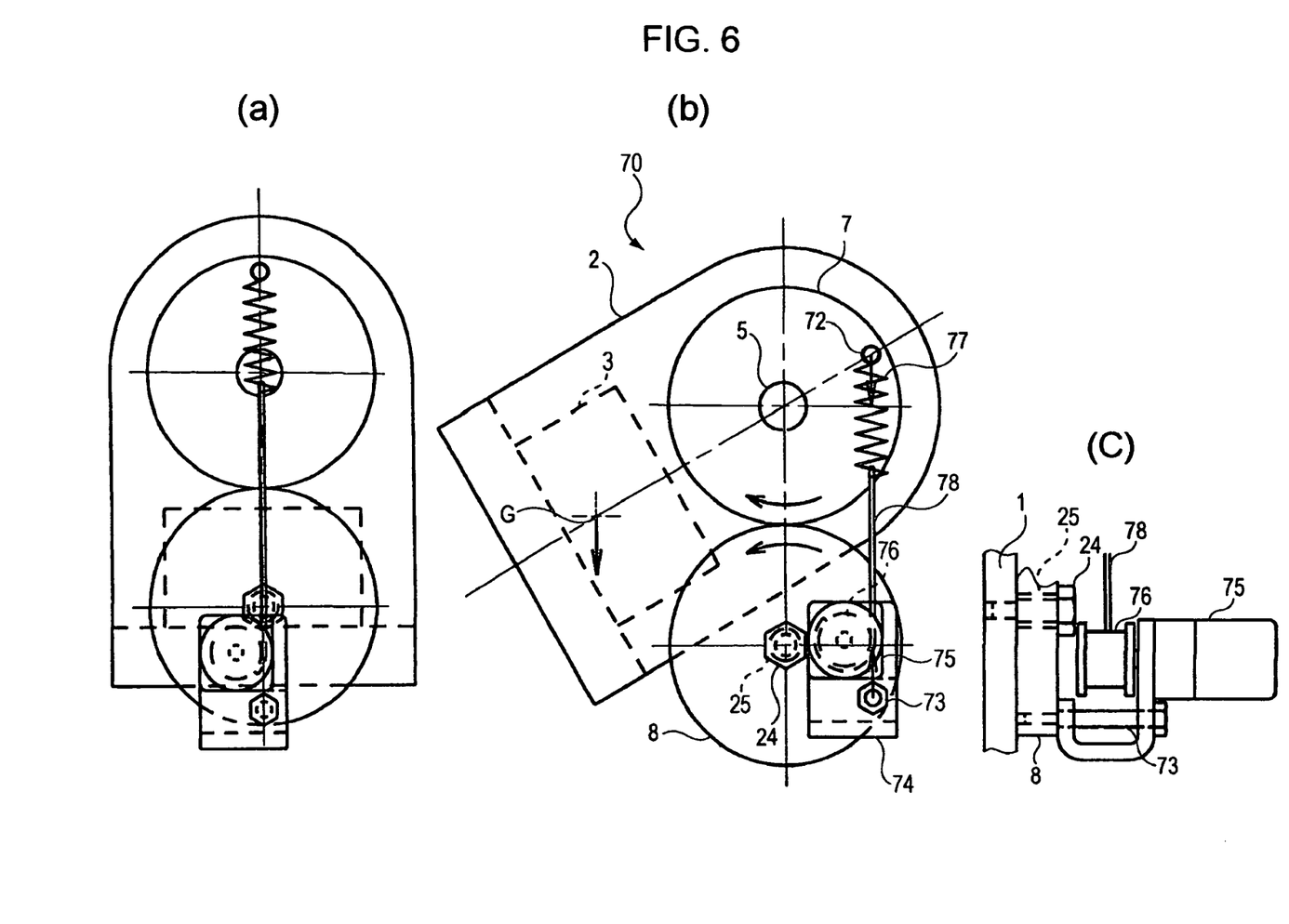
FIG. 6 illustrates a tilting table device 70 according to a third embodiment of the present invention.

FIG. 6 illustrates a tilting table device 70 according to a third embodiment of the present invention. In FIG. 6, part (a) shows a condition in which the center of gravity G of a base 2 and a table 3 is located at the lowermost position, that is, tilt angle θ=0°, part (b) shows a condition in which tilt angle θ=60° when the center of gravity G is rotated clockwise, and part (c) is a left side view of part (a).

The tilting table device 70 includes a first gear 7 serving as a first gear and fixed to a tilt shaft 5, a second gear 8 serving as a second gear and rotatably supported by a body frame 1 via a gear pin 24 attached to the body frame 1 and via a bearing 25 fitted to the gear pin 24, a retaining pin 72 serving as one retaining member and provided at the first gear 7, a retaining pin 73 serving as another retaining member and provided at the second gear 8, a motor holder 74 relatively rotatably supported by the second gear 8 via the retaining pin 73, a hoisting motor 75 fixed to the motor holder 74, a hoisting drum 76 fixed to a motor shaft of the hoisting motor 75, an extension spring 77 whose one end is supported by the retaining pin 72, and a rope 78 whose one end is coupled to another end of the extension spring 77 and whose another end is fixed to an outer circumferential surface of the hoisting drum 76. Both ends of the extension spring 77 are stretched by the retaining pin 72 and the hoisting drum 76 by a predetermined tensile force, and hence, an urging device which causes an urging force in an arrow direction is formed between the retaining pins 72 and 73.

The retaining pins 72 and 73 are at equivalent distances from the rotation centers. Referring to part (a) of FIG. 6, when the center of gravity G of the base 2 and the table 3 is located at the lowermost position, the retaining pins 72 and 73 are located on a line connecting the rotation centers of the first and second gears 7 and 8, and are located outside the two rotation centers.

Referring to part (b) of FIG. 6, in a condition of tilt angle θ=60° when the center of gravity G of the base 2 and the table 3 is rotated clockwise, the retaining pins 72 and 73 are located on a side opposite to the center of gravity G with respect to the line connecting the rotation centers of the first and second gears 7 and 8. A force in an arrow direction caused by the extension spring 77 and applied to the first gear 7 and the second gear 8 via the retaining pins 72 and 73 causes a torque to be generated in an opposite direction to a direction of a torque caused by the center of gravity G of the base 2 and the table 3. Thus, the torque applied to the tilt shaft 5 is reduced.

The hoisting motor 75 is a decelerating motor, the position of which is controlled, and the rotation angle of which is controlled such that the length of the extension spring 77 is kept to a substantially predetermined length in all tilting range. That is, the hoisting motor 75 has a predetermined rotation angle preset for every tilt angle. The spring 77 is always kept to have a predetermined length, so as to keep the tensile force to a predetermined value. In particular, the hoisting motor 75 is rotated in one direction to increase a wound length of the rope 78 when the tilt angle of the center of gravity G is increased and the retaining pins 72 and 73 come close to each other. In a reverse situation, the hoisting motor 75 is rotated in a reverse direction to decrease the wound length of the rope 78.

In this embodiment, the position of the hoisting motor 75 is controlled such that a rotation angle is set for every tilt angle. However, a torque control may be carried out by a torque motor. The torque is always kept at a desired predetermined torque regardless of the tilt angle. Accordingly, the predetermined torque is applied to the first gear 7 and the second gear 8. Thus, the torque applied to the tilt shaft 5 is reduced.

Figure 7:
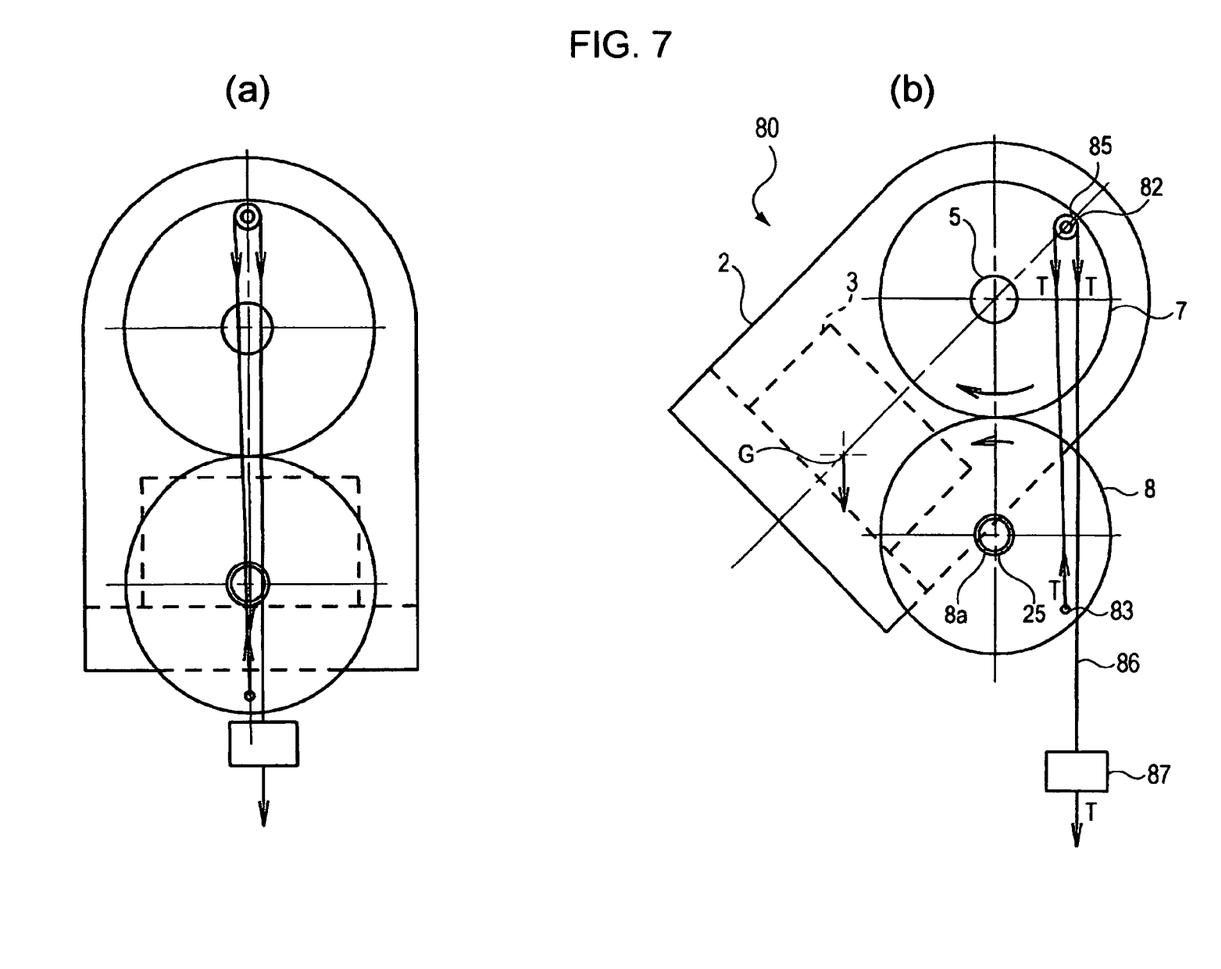
FIG. 7 illustrates a tilting table device 80 according to a fourth embodiment of the present invention.

FIG. 7 illustrates a tilting table device 80 according to a fourth embodiment of the present invention. In FIG. 5, part (a) shows a condition in which the center of gravity G of a base 2 and a table 3 is located at the lowermost position, that is, tilt angle θ=0°, and part (b) shows a condition in which tilt angle θ=45° when the center of gravity G is rotated clockwise.

The tilting table device 80 includes a first gear 7 serving as a first gear and fixed to a tilt shaft 5, a second gear 8 serving as a second gear, having a gear pin 8a at the axis center thereof, and rotatably supported by a body frame via a bearing 25, a retaining pin 82 serving as one retaining member and provided at the first gear 7, a pulley 85 rotatably supported by the first gear 7 via the retaining pin 82, a pulley 85 rotatably supported by the first gear 7 via the retaining pin 82, a retaining pin 83 serving as another retaining member and provided at the second gear 8, a rope 86 wound around the pulley 85 and having one end coupled to the retaining pin 83, and a balance weight 87 coupled to another end of the rope 86. Similarly to the tilting table device 70, the retaining pins 82 and 83 are at equivalent distances from the rotation centers of the tilting table device 70. Referring to part (a) of FIG. 7, when the center of gravity G of the base 2 and the table 3 is located at the lowermost position, the retaining pins 82 and 83 are located on a line connecting the rotation centers of the first and second gears 7 and 8, and are located outside the two rotation centers.

Referring to part (b) of FIG. 7, in a condition of tilt angle θ=45° when the center of gravity G of the base 2 and the table 3 is rotated clockwise, the retaining pins 82 and 83 are located on a side opposite to the center of gravity G with respect to the straight line. In this embodiment, a force applied to the retaining pins 82 and 83 via the rope 86 has to be constantly a force in a vertical direction, and the direction of the force has to correspond to a direction of a gravity T of the balance weight 87. Thus, the straight line connecting the rotation centers of the first and second gears 7 and 8 is provided as a vertical line.

A gravity T of the balance weight 87 is applied to the retaining pin 83 via the rope 86 in an arrow direction. Gravities T are applied to the pulley 85 rotatably supported by the retaining pin 82, in equivalent arrow directions via the rope 86 provided on both side of the gravity T. Thus, when r denotes a distance from each of the retaining pins 82 and 83 to the corresponding rotation center, and θ denotes a tilt angle, a torque of 3×r×T×sin θ is applied to the tilt shaft, and accordingly the torque to be applied is reduced.

INDUSTRIAL APPLICABILITY

The present invention is not limited to any of the above-described embodiments, and various modifications can be made within the scope of the present invention.

The invention claimed is:

1. A tilting table device including a body frame, a table, and a tilt shaft which is rotationally driven to tilt the table, the tilt shaft being rotatably supported by the body frame, the table being supported by the body frame via the tilt shaft, the tilting table device comprising:
 a first rotary member which is fixed to the tilt shaft or a shaft rotated by the tilt shaft, and hence is rotated by a rotation amount equivalent to that of the tilt shaft when the rotation of the tilt shaft is transmitted;
 a second rotary member which has an axis parallel to that of the first rotary member, is connected to the first rotary member, and is rotated by a rotation amount equivalent to or substantially equivalent to that of the first rotary member in a direction opposite to that of the first rotary member when rotation of the first rotary member is transmitted;

a first retaining member provided on a surface of the first rotary member extending in a direction intersecting with the axis of the first rotary member;

a second retaining member provided on a surface of the second rotary member extending in a direction intersecting with the axis of the second rotary member, the second retaining member being arranged such that a distance between the second retaining member and a rotation center of the second rotary member is equivalent to or substantially equivalent to a distance between the first retaining member and a rotation center of the first rotary member; and an urging device connected to the first and second rotary members respectively through the first and second retaining members, wherein, the first and second rotary members are connected to each other such that, when a center of gravity of the table is located at an uppermost position or a lowermost position, the first and second retaining members are in a phase in which the first and second retaining members are located on or near a line connecting the rotation centers of the first and second rotary members and the first and second retaining members are in a phase in which the first and second retaining members are provided inside or outside with respect to the two rotation centers, and wherein the urging device causes a constant urging force that is an urging force in a direction in which a torque applied to the tilt shaft is reduced, to be applied between the first and second retaining members by movement of the center of gravity of the table from the uppermost position or the lowermost position as a result of the rotation of the tilt shaft.

2. The tilting table device according to claim 1, wherein the urging device includes a fluid-pressure cylinder device having a cylinder body and a piston rod which is slidably supported by the cylinder body and urged in a direction with a constant fluid pressure, the cylinder body being coupled to one of the first and second rotary members via the corresponding retaining member, the piston rod being coupled to another one of the first and second rotary members via the corresponding retaining member.

3. The tilting table device according to claim 1 or 2, wherein the first and second rotary members are formed as first and second gears which mesh with each other, the first gear being fixed to the tilt shaft, the second gear being rotatably provided at the body frame.

4. The tilting table device according to claim 1 or 2, wherein a third gear is supported by the tilt shaft at a position apart from the first gear in an axial direction, and a fourth gear is rotatably provided at the body frame at a position apart from the second gear in an axial direction, the third and forth gears meshing with each other, a gear ratio of the third and forth gears being equivalent to a gear ratio of the first and second gears, the fluid-pressure cylinder device being provided between the gears apart from each other in the axial direction, the one of the cylinder body and the piston rod being supported by the first and third gears via the retaining member, the another one of the cylinder body and the piston rod being supported by the second and fourth gears via the retaining member.

5. The tilting table device according to claim 1 or 2, wherein the base is fixed to the tilt shaft, wherein the table is supported by the body frame via the tilt shaft and the base, and the table includes the tilt shaft which is hollow, a shaft member which is relatively rotatably inserted through the tilt shaft, the motor having a motor shaft coupled to the shaft member and a motor body fixed to the gear supported by the tilt shaft, and a rotation transmitting device provided at the base and coupled to the shaft member, the motor being configured to rotate the table via the shaft member and the rotation transmitting device.

* * * * *